United States Patent [19]
Pawelzik et al.

[11] Patent Number: 5,775,373
[45] Date of Patent: Jul. 7, 1998

[54] FLOW-DIVERTER VALVE

[75] Inventors: Manfred Pawelzik, Soest; Wolfgang Gebhardt, Menden, both of Germany

[73] Assignee: Friedrich Grohe AG, Hemer, Germany

[21] Appl. No.: 823,640

[22] Filed: Mar. 25, 1997

[30] Foreign Application Priority Data

Apr. 13, 1996 [DE] Germany ............ 196 14 653.4

[51] Int. Cl.⁶ ........................ F16K 11/00
[52] U.S. Cl. ............ 137/625.46; 137/625.3
[58] Field of Search ............ 137/625.46, 625.3, 137/887

[56] References Cited

U.S. PATENT DOCUMENTS

| | | |
|---|---|---|
| 4,767,052 | 8/1988 | Kostorz . |
| 4,794,952 | 1/1989 | Burkhard ............ 137/625.46 X |
| 5,022,429 | 6/1991 | Rolbini et al. ............ 137/624.46 X |
| 5,190,077 | 3/1993 | Pawelaih et al. ............ 137/725.46 |

FOREIGN PATENT DOCUMENTS

| | | |
|---|---|---|
| 28 41 998 | 4/1980 | Germany . |
| 36 38 959 | 5/1988 | Germany . |

*Primary Examiner*—John Fox
*Attorney, Agent, or Firm*—Herbert Dubno; Andrew Wilford

[57] ABSTRACT

A diverter valve has a housing forming an inlet for pressurized fluid and a pair of separate outlets connectable to respective users. A valve disk fixed in the housing is centered on an axis and has to one side of a diameter through the axis two axially throughgoing outlet ports each communicating with a respective one of the outlets and to the other side of the diameter an axially throughgoing inlet port communicating with the inlet. The ports are spaced about the axis and centered on a circle itself centered on the axis. A valve disk sitting on the fixed valve disk is movable in the housing about the axis. This movable valve disk is formed with a pair of axially throughgoing holes spaced about the axis and centered on the circle. A spindle rotatable in the housing about the axis is connected to the movable valve disk for displacing the movable valve disk from a central blocking position in which the holes overlap only the inlet port and between one end position in which one of the holes overlaps one of the outlet ports and the inlet port and permits fluid communication therebetween and another end position in which the other of the holes overlaps the other of the outlet ports and the inlet port and permits fluid communication therebetween.

14 Claims, 7 Drawing Sheets

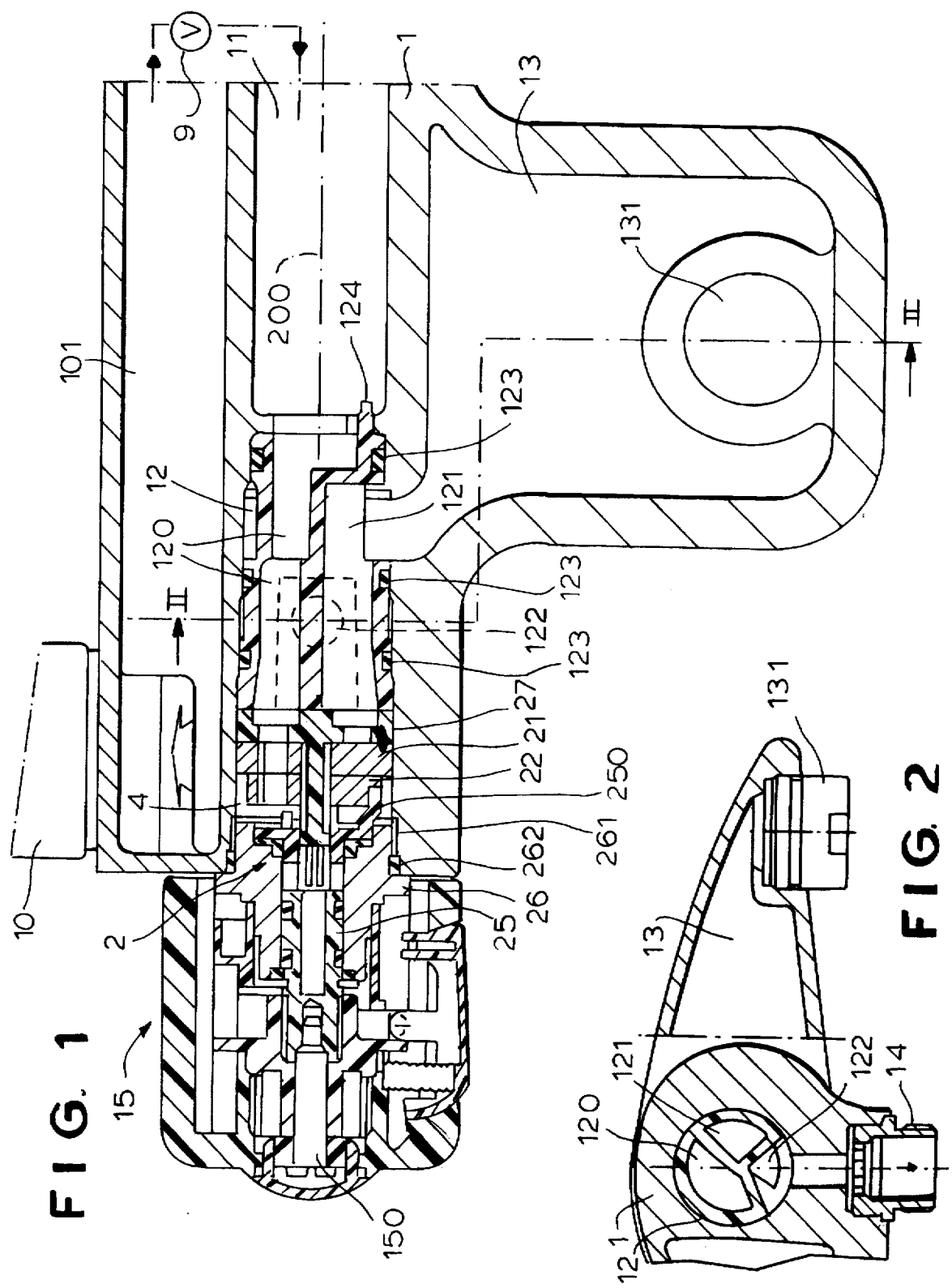

FLOW-DIVERTER VALVE

SPECIFICATION

FIELD OF THE INVENTION

The present invention relates to a valve. More particularly this invention concerns a flow-diverter valve with a single input and a pair of outputs.

BACKGROUND OF THE INVENTION

A standard flow-diverting valve, as used for instance in a bathroom to direct a flow of mixed hot and cold water to a spout or to a shower, typically has a housing and a disk-type valve element that can be pivoted between end positions. Ports in the housing and holes in the valve element cooperate so that in one end position the flow is directed to the spout and in the other end position to the shower.

As described in German patent 2,847,998 of A. Rüth the valve has two ceramic valve disks with central input ports so that the pressure of the fluid pushes the two valve disks against each other. Several smaller outlet ports are formed offset from the disk centers and let the fluid pass out of the valve in the appropriate positions of the disks. In one position all of the outlet ports are blocked so the diverter valve is closed.

Such a construction, with a central inlet port, requires that the valve structure be somewhat bulky. The result is a large-diameter valve that is often considered ugly.

German patent 3,638,959 of H. Körfgen described another disk-type diverter valve with no central inlet passage. Here the fluid is fed via a passage in the housing past the two disks so that, once again, the fluid pressure holds the disks tightly together. The provision of this extra passage increases the size of the valve again, so that this system is no less bulky than the other described above.

OBJECTS OF THE INVENTION

It is therefore an object of the present invention to provide an improved flow-diverter valve.

Another object is the provision of such an improved flow-diverter valve which overcomes the above-given disadvantages, that is which is relatively compact and of simple construction.

SUMMARY OF THE INVENTION

A diverter valve has according to the invention a housing forming an inlet for pressurized fluid and a pair of separate outlets connectable to respective users. A valve disk fixed in the housing is centered on an axis and has to one side of a diameter through the axis two axially throughgoing outlet ports each communicating with a respective one of the outlets and to the other side of the diameter an axially throughgoing inlet port communicating with the inlet. The ports are spaced about the axis and centered on a circle itself centered on the axis. A valve disk sitting on the fixed valve disk is movable in the housing about the axis. This movable valve disk is formed with a pair of axially throughgoing holes spaced about the axis and centered on the circle. A spindle rotatable in the housing about the axis is connected to the movable valve disk for displacing the movable valve disk from a central blocking position in which the holes overlap only the inlet port and between one end position in which one of the holes overlaps one of the outlet ports and the inlet port and permits fluid communication therebetween and another end position in which the other of the holes overlaps the other of the outlet ports and the inlet port and permits fluid communication therebetween.

With this construction it is possible to make the valve relatively slim so that it can be incorporated in an attractive fitting. At the same time this slim valve can be used for a relatively large water flow since the flow cross section of the various ports and holes can be considerable.

According to the invention the ports and holes are formed generally as segments of a circular annulus. The fixed disk is formed with a web radially bridging the inlet port. The housing is provided with a spout connected to one of the outlet ports and a shower connection connected to the other of the outlet ports. The one outlet port of the spout is of greater flow cross section than the other outlet port of the shower connection. The web divides the inlet port into a large portion communicating with the spout outlet port in the position of the movable valve disk permitting fluid communication therewith.

To make the valve operate as silently as possible, in particularly in the barely open position, the outlet ports each have an angularly directed edge formed with a row of angularly directed teeth so that at ends of travel of the movable valve disk flow through the outlet ports is subdivided by the teeth into a plurality of discrete streams. The teeth have a flank angle of between 5° and 10° and an angular height of between 1 mm and 2 mm. Each row extends radially and has three such teeth. These teeth can be provided on either the movable or fixed disk.

In accordance with the invention the spindle and disks are connected together as a unit. More specifically this connection includes a base disk fixed in the housing, forming the inlet and outlets, and having formations rotationally fixing the fixed disk in the housing. In addition a snap coupling is provided between the base disk and the fixed and movable disks. The base disk is formed with a stem projecting along the axis through the fixed and movable disks and provided with the snap coupling. The base disk is made of plastic and the fixed and movable disks are ceramic. The base disk is formed around the inlet and outlet with seal ridges.

BRIEF DESCRIPTION OF THE DRAWING

The above and other objects, features, and advantages will become more readily apparent from the following description, reference being made to the accompanying drawing in which:

FIG. 1 is an axial section through the valve according to the invention;

FIG. 2 is a section taken along line II—II of FIG. 1;

SPECIFIC DESCRIPTION

Figure 3A:
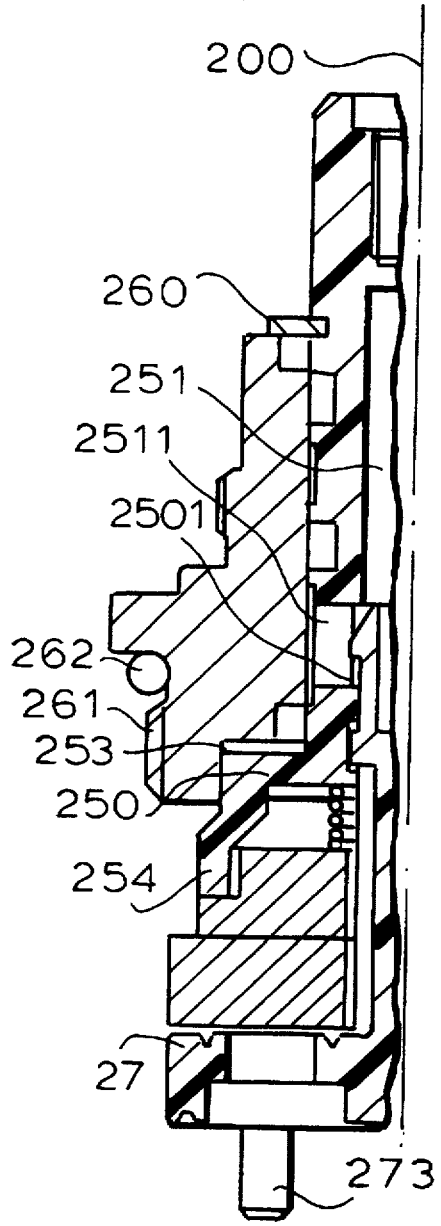
FIGS. 3A and 3B are large-scale axial sections through the diverter-valve assembly of the invention in two different positions.

As seen in FIGS. 1 and 2 a valve according to this invention has a metallic cast housing 1 provided internally with a diverter valve 2 operated by a knob 15. Hot- and cold-water inlet pipes 10 (only one shown) supply hot and cold water to the housing 1 to respective compartments or passages 101 (only one shown) connected to the intake of a mixing valve shown schematically at 9 and corresponding to the thermostatic valve described in U.S. Pat. No. 4,767,052. The tempered- or mixed-water output of this valve 9 is fed to a passage or compartment 11 of the housing 1.

The housing 1 holds an insert 12 having a port-forming inlet compartment 120 communicating with the mixed-water passage 11, and, angularly offset therefrom relative to an axis 200, an outlet compartment 121 communicating with a spout passage 13, and an outlet compartment 122 communicating with a fitting 14. The spout 13 carries an aerator 131 and the fitting 14 is adapted to be connected via a hose to a hand shower.

Figure 5:
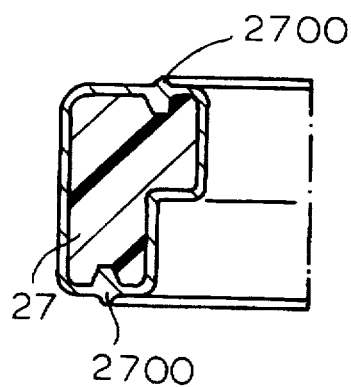
FIG. 5 is a large-scale view of a detail of FIG. 4.
Figure 4:
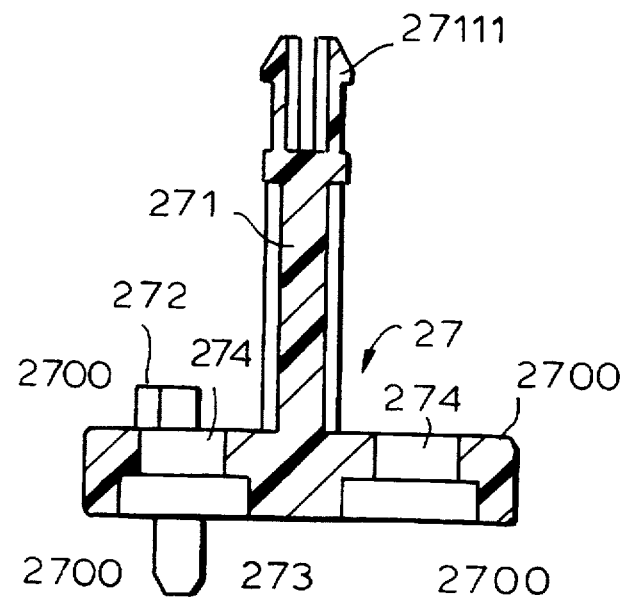
FIG. 4 is a sectional view of a detail of FIG. 1.

As better seen in FIGS. 3A through 5 the diverter-valve assembly 2 has a tubular body 26 that is secured by a screwthread 261 in the valve housing 1, that is centered on the axis 200, and that holds a plastic spindle 25 sealed with respect to the body 26 by O-rings 252. A plastic base disk 27, a fixed ceramic valve disk 21, and a movable ceramic valve disk 22 are stacked between the spindle 25 and the insert 12. The spindle 25 has an end 250 that bears via a Teflon washer 253 on a shoulder of the body 26 so that the spindle 25 can turn smoothly in the body 26 about the axis 200. The disk 27 is formed as shown in FIG. 5 around each hole 274 with an annular ridge 2700 that engages the respective face of the disk 21 or the insert 12. The housing 1 forms a compartment 4 to the opposite side of the disks 21 and 22 as the insert 12.

The base disk 27 has ports 274 aligned with the passages 120, 121, and 122 of the insert 12 and has a back face provided with rearwardly projecting pins 273 that engage into this insert 12 to prevent rotation of this base disk 27. A front face of the disk 27 is formed with diametrally opposite and forwardly projecting pins 272 that engage in complementary rearwardly open cutouts 29 (FIG. 6) of the fixed disk 21 to lock it rotationally in the housing 1 also, and has a forwardly projecting center stem 271 that projects through center holes 28 of the disks 21 and 22.

Figure 6:
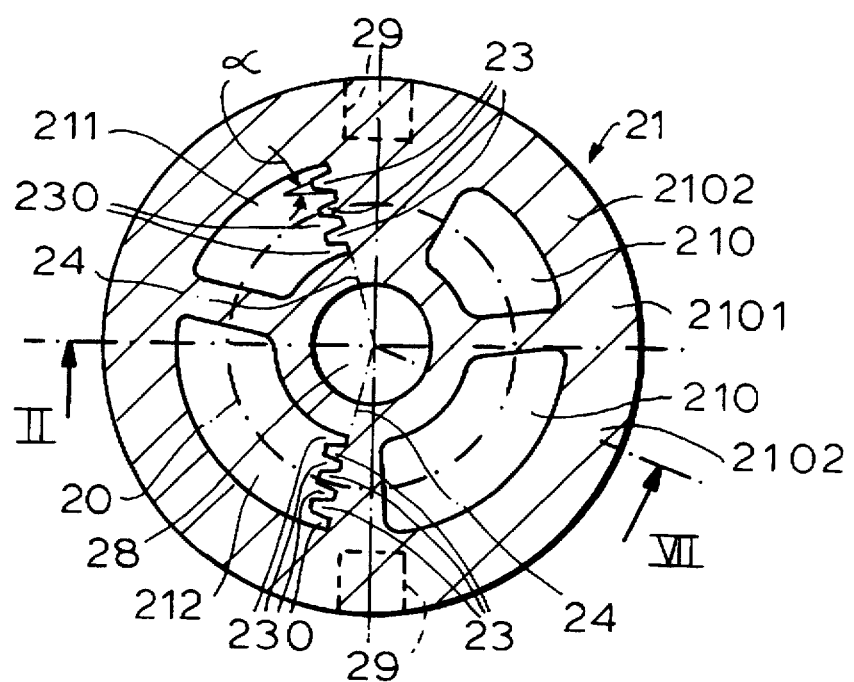
FIG. 6 is an end view of the fixed valve disk of the valve of FIGS. 3A and 3B.
Figure 7:
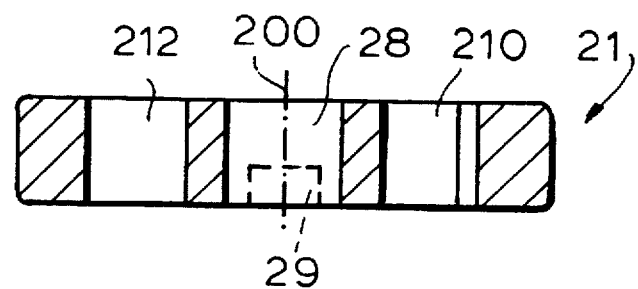
FIG. 7 is a section taken along line VII—VII of FIG. 6.

The fixed disk 21 has as better shown in FIGS. 6 and 7 a main inlet port 210 formed as a circle segment and bridged by a web 2101 to stabilize an outer portion 2102 or the disk 21. This port 210 communicates with the inlet port 120 of the insert 12. In addition the disk 21 is formed with a pair of ports 211 and 212 respectively aligned with the respective ports 122 and 121 of the insert 12, the latter port 212 being of an angular dimension about twice that of the port 211. The ports 210, 211, and 212 are all centered on a circle 20 centered on the axis 200 and having a diameter of about 15 mm.

The outer edges of the ports 211 and 212 are formed with angularly inwardly projecting teeth 23 defining gaps 230, and having bases extending along radii 24 from the axis 200. The teeth 23 have an angular height of about 1.2 mm and a flank angle α of about 12°.

Figure 8:
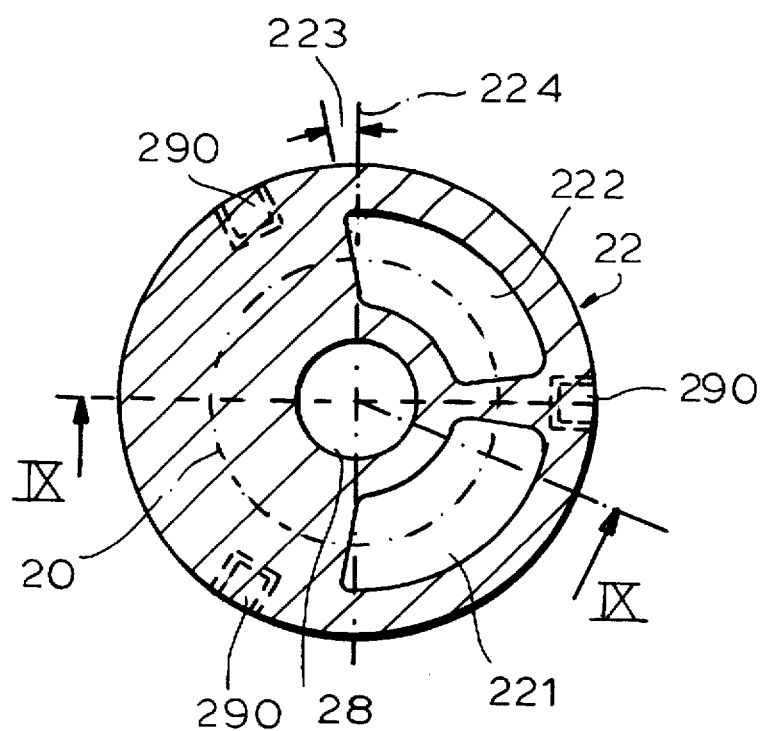
FIG. 8 is an end view of the movable valve disk of the valve of FIGS. 3A and 3B.
Figure 9:
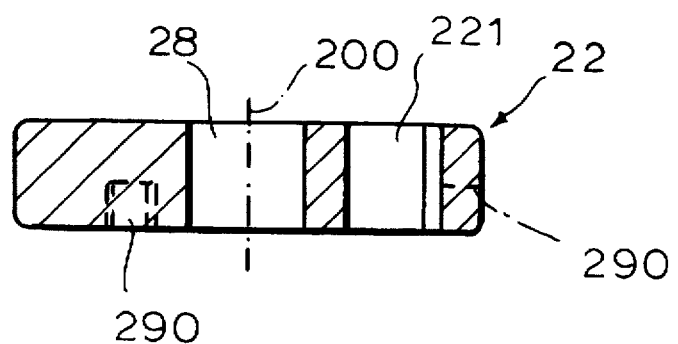
FIG. 9 is a section taken along line IX—IX of FIG. 8.

The disk 22 is formed as shown in FIGS. 8 and 9 with three angularly equispaced and forwardly open holes 290 in which engage fingers 254 projecting backward from the spindle end 250. Thus this disk 22 is rotationally coupled to the spindle 25. It is formed centered on the circle 20 with two throughgoing apertures or holes 221 and 222. The hole 222 can overlap the ports 210 and 211 and the hole 221 can overlie the ports 210 and 212. Thus depending on the angular position of the disk 22, the tempered water from the port 210 is fed either to the spout 13 or to the shower fitting 14. The end faces of the ports 221 and 222 are inclined at an angle 223 of 5° to 10°, here 6°, to a diameter 224 of the disks 22 so the flow from the port 210 to the ports 211 and 212 is choked off gradually.

Figure 3B:
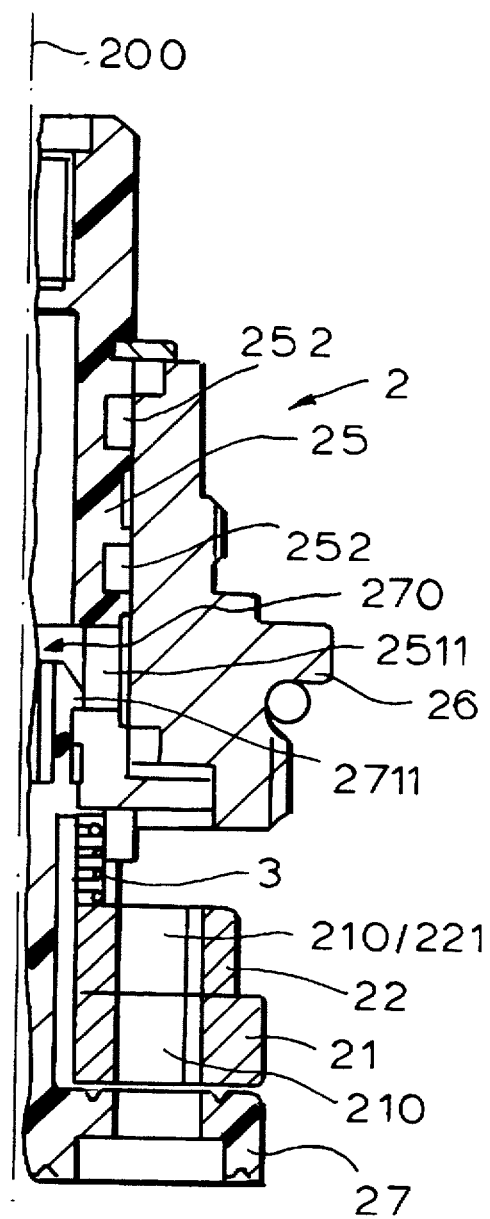

The two disks 21 and 22 engage against each other with polished planar faces. In addition the stem 271 is formed at its inner end with a snap coupling 270 formed by barbs 2711 that can engage over a shoulder 2501 formed in a blind bore 251 extending axially in the spindle 25. Radial openings 2511 allow these barbs 2711 to be pressed in for disassembly of the system. A compression spring 3 is braced axially between the inner end of the spindle 25 and the movable disk 21 to maintain the confronting faces of the disks 21 and 22 in tight engagement with each other. In the installed position this spring 3 is compressed as shown in FIG. 3A; prior to installation the position of FIG. 3B is assumed.

The valve according to the invention is assembled as follows:

First the disks 21 and 22 and spring 3 are slipped over the stem 271 of the base disk 27 to snap the barbs 2711 in place and compress the spring 3. Then the spindle 25 is pushed through the body 26 and secured in place by a snap ring 260, in which position the end 250 bears via the washer 253 on the shoulder of the body 26 and the three fingers 254 engage in the recesses 290. After installing the insert sleeve 12 with its seal rings 123 in the housing 1 the body 26 is secured by its screwthreads 261 in this housing 1, compressing an O-ring 262 to form a tight seal. The knob 15 is secured in place by a screw 150 and the assembly is complete. Assembly of the valve 9 is done according to U.S. Pat. No. 4,767,052.

In use the temperature of the water in the compartment 11 is determined by the valve 9. It passes through the passage 120 and port 210 to the back face of the disk 22.

Figure 10:
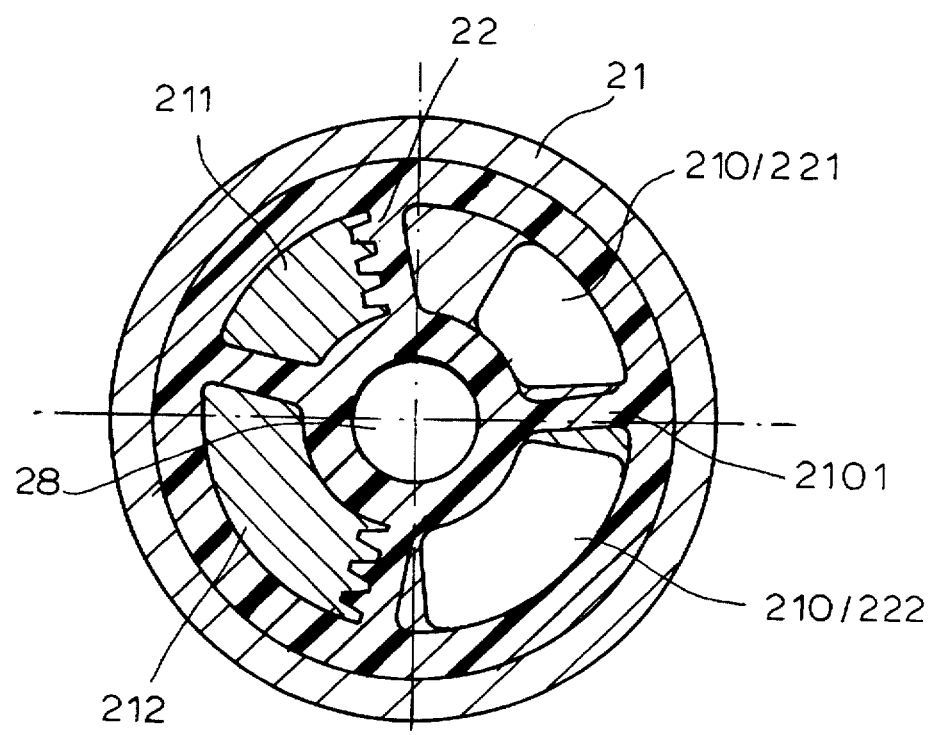

In the position of FIG. 10 neither of the opening 221 or 222 overlaps with either of the openings 211 or 212 and there is no flow through the valve. This is the fully closed or blocked position.

Figure 12:
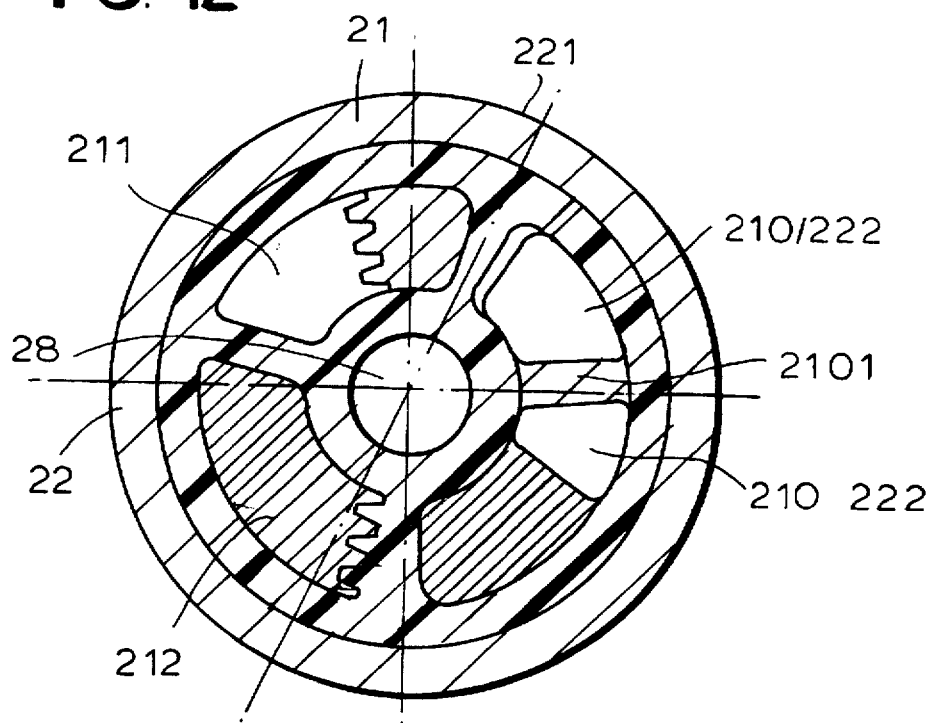
FIGS. 10, 11, 12, 13, and 14 are end views of the valve disks in various different positions.
Figure 11:
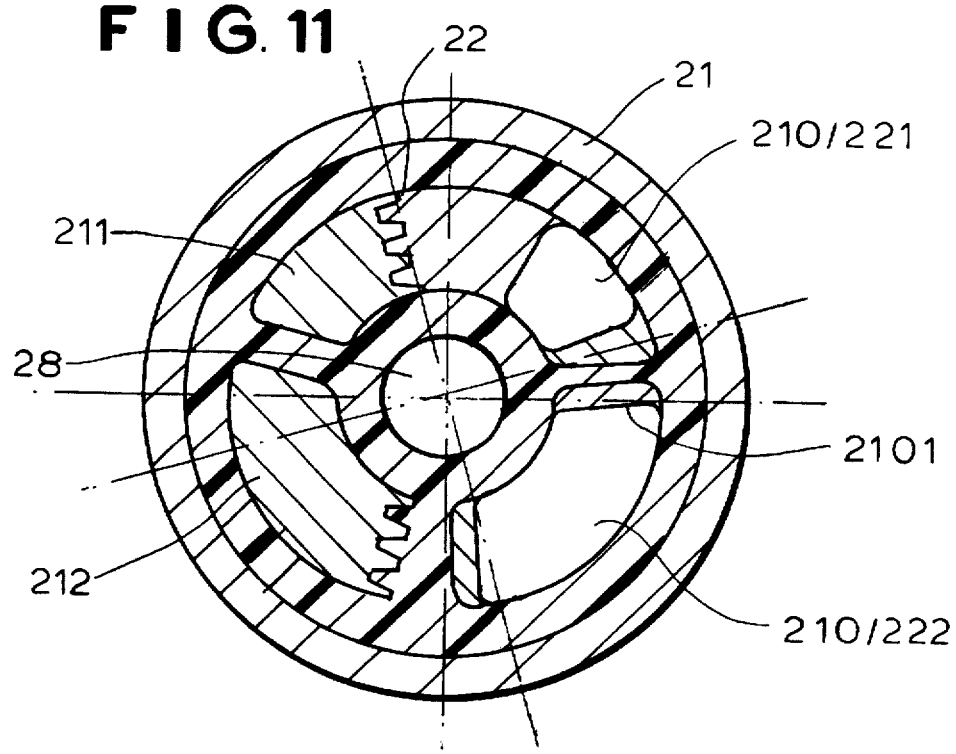

Turning of the disk 22 with the handle 15 counterclockwise about the axis as shown in FIG. 11 and then in FIG. 12 allows the opening 210 to communicate through the opening 221 with the opening 211 to permit flow to the shower fitting 14. The flow cross section is very gradually opened, first with only the gap 230 at the outer edge of the port 211 being exposed, and then the further gaps 230 until the entire port 211 is open, so that flow is very quiet and gentle. Eventually the end position (FIG. 12) of full flow is reached. Since normally less flow is needed for showering than when the tub is being filled, the opening 211 is of substantially smaller cross section than the opening 212 which nonetheless opens and closes in the same gentle manner.

Figure 13:
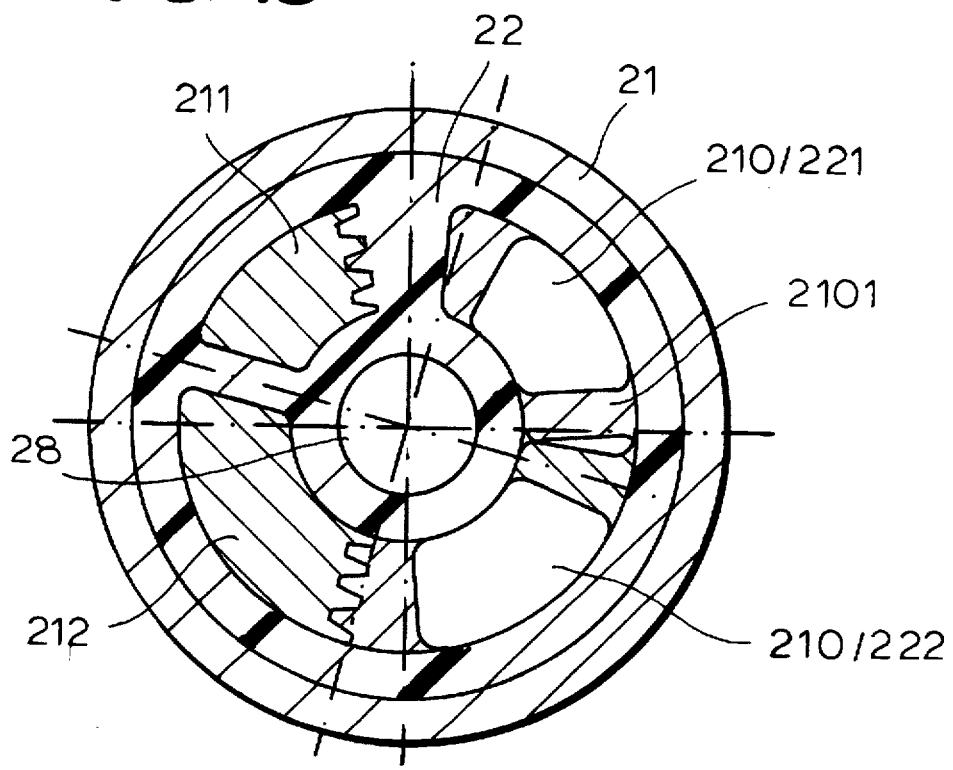
Figure 14:
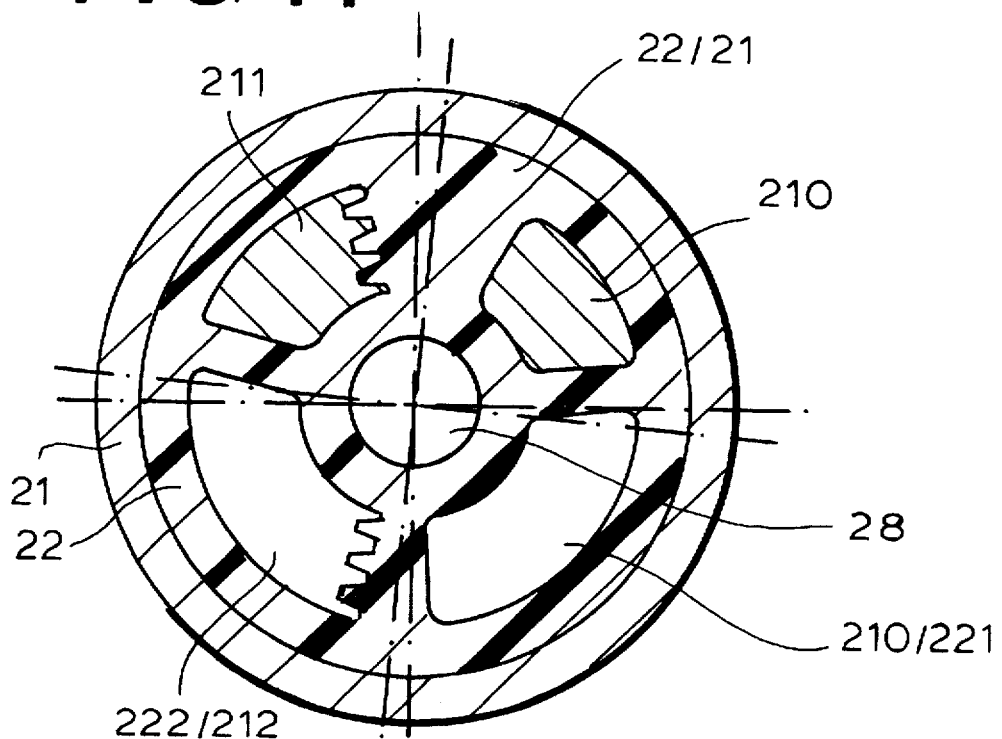

Reverse rotation returns the assembly to the blocked position of FIG. 13 and then to the open position of FIG. 14.

We claim:

1. A diverter valve comprising:
   a housing forming an inlet for pressurized fluid and a pair of separate outlets connectable to respective users;
   a valve disk fixed in the housing, centered on an axis, and having to one side of a diameter through the axis two axially throughgoing outlet ports each communicating with a respective one of the outlets and to the other side of the diameter an axially throughgoing inlet port communicating with the inlet, the ports being spaced about the axis and centered on a circle itself centered on the axis;
   a valve disk sitting on the fixed valve disk and movable in the housing about the axis, the movable valve disk being formed with a pair of axially throughgoing holes spaced about the axis and centered on the circle; and means including a spindle rotatable in the housing about the axis and connected to the movable valve disk for displacing the movable valve disk from a central blocking position in which the holes overlap only the inlet port and between one end position in which one of the holes overlaps one of the outlet ports and the inlet port and permits fluid communication therebetween and another end position in which the other of the holes overlaps the other of the outlet ports and the inlet port and permits fluid communication therebetween.

2. The diverter valve defined in claim 1 wherein the ports and holes are formed generally as segments of a circular annulus.

3. The diverter valve defined in claim 2 wherein the fixed disk is formed with a web radially bridging the inlet port.

4. The diverter valve defined in claim 1 wherein the housing is provided with a spout connected to one of the outlet ports and a shower connection connected to the other of the outlet ports, the one outlet port of the spout being of greater flow cross section than the other outlet port of the shower connection.

5. The diverter valve defined in claim 4 wherein the fixed disk is formed with a web radially bridging the inlet port and dividing same into a large portion communicating with the spout outlet port in the position of the movable valve disk permitting fluid communication therewith.

6. The diverter valve defined in claim 1 wherein the outlet ports each have an angularly directed edge formed with a row of angularly directed teeth, whereby at ends of travel of the movable valve disk flow through the outlet ports is subdivided by the teeth into a plurality of discrete streams.

7. The diverter valve defined in claim 6 wherein the teeth have a flank angle of between 5° and 10°.

8. The diverter valve defined in claim 6 wherein the teeth have an angular height of between 1 mm and 2 mm.

9. The diverter valve defined in claim 6 wherein each row extends radially and has three such teeth.

10. The diverter valve defined in claim 1, further comprising means connecting the spindle and disks together as a unit.

11. The diverter valve defined in claim 10 wherein the connecting means includes a base disk fixed in the housing, forming the inlet and outlets, and having formations rotationally fixing the fixed disk in the housing.

12. The diverter valve defined in claim 11 wherein the connecting means includes a snap coupling between the base disk and the fixed and movable disks.

13. The diverter valve defined in claim 12 wherein the base disk is formed with a stem projecting along the axis through the fixed and movable disks and provided with the snap coupling.

14. The diverter valve defined in claim 12 wherein the base disk is made of plastic and the fixed and movable disks are ceramic, the base disk being formed around the inlet and outlet with seal ridges.

* * * * *